US007000641B2

(12) United States Patent
Welfare

(10) Patent No.: US 7,000,641 B2
(45) Date of Patent: Feb. 21, 2006

(54) INFLATABLE STOPPING BAGS

(75) Inventor: Andrew Welfare, West Yorkshire (GB)

(73) Assignee: Crane Limited, Suffolk (GB)

( * ) Notice: Subject to any disclaimer, the term of this patent is extended or adjusted under 35 U.S.C. 154(b) by 134 days.

(21) Appl. No.: 10/182,431

(22) PCT Filed: Sep. 19, 2001

(86) PCT No.: PCT/GB01/04163

§ 371 (c)(1),
(2), (4) Date: Oct. 7, 2002

(87) PCT Pub. No.: WO02/37010

PCT Pub. Date: May 10, 2002

(65) Prior Publication Data

US 2003/0051761 A1    Mar. 20, 2003

(51) Int. Cl.
*F16L 55/12*        (2006.01)
(52) U.S. Cl. .................. 138/93; 138/91; 251/61.1; 137/488
(58) Field of Classification Search ............. 138/93, 138/91, 46; 251/61.1; 137/488
See application file for complete search history.

(56) References Cited

U.S. PATENT DOCUMENTS

| 1,620,707 | A | * | 3/1927 | Wunsch ................... 137/488 |
| 2,527,331 | A | * | 10/1950 | Puerner ..................... 60/463 |
| 2,582,626 | A | * | 1/1952 | Escher ...................... 251/28 |
| 2,598,207 | A | * | 5/1952 | Bailey et al. ............. 251/61.1 |
| 2,698,717 | A | * | 1/1955 | Sisco ...................... 236/15 R |
| 3,167,253 | A | * | 1/1965 | Church et al. ........... 236/80 R |
| 3,298,398 | A |   | 1/1967 | Smith |
| 4,787,408 | A | * | 11/1988 | Twerdochlib ................ 137/14 |
| 5,234,374 | A | * | 8/1993 | Hyzyk et al. .............. 454/322 |
| 5,240,031 | A | * | 8/1993 | Vigil .................... 137/315.01 |
| 5,348,270 | A | * | 9/1994 | Dinh ...................... 251/61.1 |
| 5,558,131 | A | * | 9/1996 | Cohee et al. ................ 138/93 |
| 5,778,919 | A | * | 7/1998 | Petrone ................. 137/15.08 |
| 5,934,311 | A | * | 8/1999 | Brown ..................... 137/240 |

FOREIGN PATENT DOCUMENTS

| EP | 0085915 | 8/1983 |
| GB | 1311017 | 3/1973 |
| WO | WO 01/25676 | 4/2001 |

* cited by examiner

*Primary Examiner*—James Hook
(74) *Attorney, Agent, or Firm*—Woodard Emhardt Naughton Moriarty & McNett & Henry

(57) ABSTRACT

A method of controlling the fluid pressure of an inflatable stopping bag used to block the fluid flow through a fluid conduit comprises pressurising the bag using a pressure regulator which operates to regulate the pressure of the bag as a function of the instantaneous pressure in the pipe upstream of the stopping bag.

16 Claims, 1 Drawing Sheet

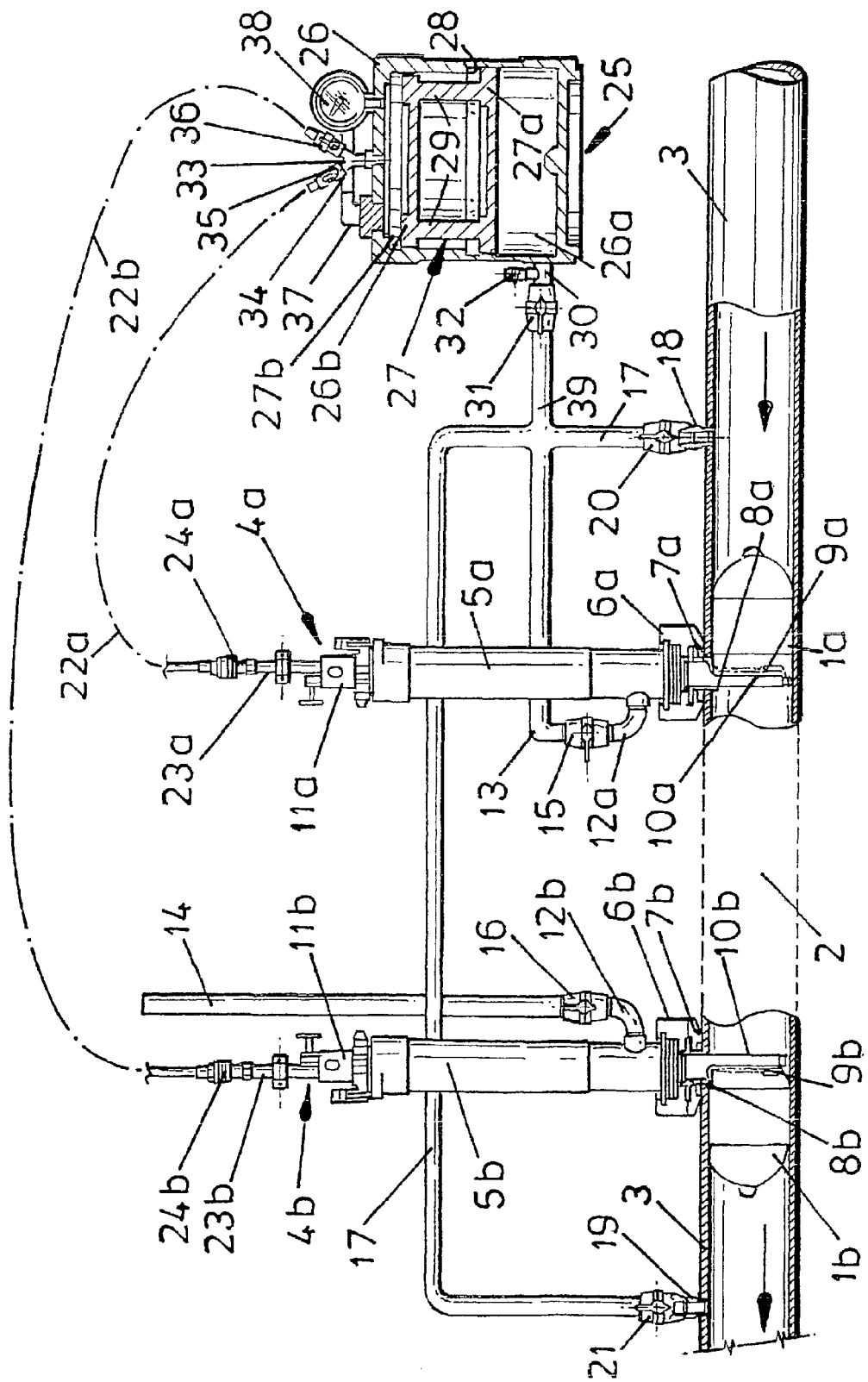

INFLATABLE STOPPING BAGS

This invention relates to inflatable stopping used to block the bore of a fluid conduit and provides a method and apparatus for regulating the pressure in such stopping bags when in use. Particularly, but not exclusively, the present invention provides a method and apparatus for regulating the pressure within stopping bags designed to be inserted through a hole drilled in a liquid conduit, such as a water mains pipe, and then subsequently inflated to form a sealed blockage in the pipe.

Inflatable stopping bags are widely used within the gas industry for temporarily stopping the flow through a section of an in-service gas mains so that maintenance work can be performed on a section of the pipe without removing the whole pipe from service. Typically two bags are used to seal the pipe upstream and downstream of the section to be worked upon. The bags are inserted in a deflated state through respective holes drilled in the pipe wall and then inflated into contact with the inner wall of the pipe to block the pipe and isolate the section to be worked. A bypass pipe is connected to respective holes drilled upstream and downstream of the isolated section of the pipe to allow a gas flow to bypass the stopping bags and thus maintain service.

Although such stopping bag systems are widely used in the gas industry they have to date had no significant use in the water industry. One reason for this is that the relatively high density and pressure of water within water mains (which can be at a pressure some ten times higher than that commonly found in gas mains) exerts much higher mechanical forces on the stopping bag apparatus which can tend to push the bags along the pipe. Recently, however, a system has been developed by Glynwed Pipe Systems Ltd which provides a practical means of mechanically supporting the bags in position to resist the forces exerted by the relatively high pressure water. This is the subject of PCT application number GB00/03771.

A further difficulty which is experienced when using stopping bag systems in a water pipe is that the pressure in the pipe fluctuates in response to changing demand. Whereas in gas mains changes in demand have little effect on the pressure of the gas (which is compressible) the pressure can vary quite widely in a water main as demand changes due to the incompressible nature of water. There is therefore a risk that if the water pressure rises significantly above the pressure in the stopping bag water may leak past the bag. There is also the potential problem that if the pressure in the water mains drops significantly below the pressure in the bag the bag may burst.

It is an object of the present invention to provide a way of obviating or mitigating the potential problems mentioned above.

According to a first aspect of the present invention there is provided a method of controlling the fluid pressure of an inflatable stopping bag used to block the fluid flow through a fluid conduit, the method comprising pressurising the bag using a pressure regulator which operates to regulate the pressure of the bag as a function of the instantaneous pressure in the pipe upstream of the stopping bag.

According to a second aspect of the present invention there is provided apparatus for regulating the pressure in an inflatable stopping bag for use in blocking a fluid conduit, the apparatus comprising a pressure regulator which automatically regulates the pressure in the stopping bag when in use in response to the instantaneous pressure within the fluid conduit upstream of the stopping bag.

A specific embodiment of the present invention will now be described, by way of example only, with reference to the accompanying drawing which is a schematic illustration of an embodiment of the present invention incorporated in a double bag stopping apparatus designed for blocking flow through a water mains pipe.

BRIEF DESCRIPTION OF THE DRAWING

The invention is illustrated in use with a stopping bag system according to Glynwed Pipe Systems Limited PCT Application Number GB00/03771 mentioned above, which discloses one particular form of stopping bag apparatus which is particularly suited for use in water pipes.

The apparatus in accordance with the invention described below, can however be used with any conventional stopping bag system and thus details of the stopping bag insertion and support apparatus will be only briefly described.

Referring to the drawing, the illustrated stopping bag system is a double bag system comprising two identical stopping bags 1a and 1b installed upstream and downstream of the working section 2 of a water mains pipe 3. In the drawing the bags 1a and 1b are shown in their inflated state following insertion via respective bag insertion assemblies 4a and 4b which are themselves supported within conventional machine housings 5a and 5b. The machine housings 4a and 4b are each mounted to a machine base 6a and 6b which may be secured to the pipe 2 by a chain or the like (not shown) and sealed with respect of the pipe by an annular sealing member 7a and 7b. each machine base 6a, 6b houses a sliding plate valve (not shown in detail) to allow access to the interior of the pipe through holes 8a, 8b. Each machine base 6a, 6b thus provides a platform to which different machines can be mounted to perform operations on the pipe 3. For instance, the machine bases 6a and 6b are initially used to support conventional drilling apparatus used to drill the holes 5a, 5b in the pipe 2 through which the bags 1a and 1b are then inserted.

Each stopping bag apparatus comprises a support device 9a,9b mounted to the end of a respective post 10a,10b which is an extension of a bag insertion tube 11a, 11b. The support devices 9a,9b support the inflated bags to resist the forces exerted on the bags in use by the water pressure within the pipe 3.

Each of the machine assemblies 4a and 4b has a side pipe 12a, 12b which are connected to a recharge pipe 13 and a vent pipe 14 respectively by way of valved couplings 15 and 16. The recharge pipe 13 provides a conduit for re-filling the working section of pipe 3 prior to removal of the bags if necessary once the work is complete. The vent pipe 14 can be used to release air during the re-filling operation.

The recharge pipe 13 feeds from a bypass pipe 17 which is connected between upstream and downstream bypass nipples 18 and 19 each of which is provided with a respective valve 20 and 21 to control flow through the bypass pipe 17. The bypass pipe 17 is provided to allow water to bypass the working section 2 of pipeline whilst work is being carried out and therefore maintain a water supply downstream of the stopping bag apparatus. In the illustration the bypass pipe 17 is relatively narrow compared to the mains pipe 3 but may be much larger in practice.

As mentioned at the beginning of this description, the details of the stopping bag apparatus itself, and the manner of its installation, may be entirely conventional and thus the particular apparatus illustrated has only been described above in brief outline. In use the bags 1a, 1b are inserted into the pipe 3 through the apertures 8a, 8b in a deflated state by lowering the bag insertion tubes 11a, 11b through the machine assemblies 5a, 5b. The bag support devices 9a, 9b are then deployed (in this instance the support devices 9a, 9b comprise a plurality of slats which are fanned out across the bore of the pipe). The bags are then inflated by pumping a suitable fluid into the bags 1a, 1b via inflation hoses 22a, 22b connected to respective inflation tubes 23a, 23b, via couplings 24a, 24b, which extend through the bag insertion tubes 11a, 11b.

The present invention provides a method and apparatus for supplying pressurised fluid to the bags 1a, 1b (via the inflation hoses 22a, 22b) to both inflate and regulate the pressure within the bags 1a, 1b. Referring to the drawing, the illustrated embodiment of the invention comprises a pressure regulator 25 which provides means for both inflating the bags 1a and 1b and for regulating the pressure in the bags 1a and 1b as a direct function of the pressure within the pipe 3 upstream of the bag 1a.

In more detail, the pressure regulator 25 comprises a cylinder 26 within which is mounted a piston assembly 27. The cylinder 26 has a relatively large diameter chamber 26a and a relatively small diameter chamber 26b, an annular shoulder 28 being defined where the two portions 26a, 26b meet (approximately mid way along the axis of the cylinder 26).

The piston assembly 27 comprises two connected pistons 27a and 27b which are connected by way of rods 29. Each of the pistons 27a and 27b comprises a disc which is sealed with respect to the internal wall of the cylinder 26 by piston rings 28a and 28b respectively. The piston 27a has a larger diameter than piston 27b and is in sliding engagement with the larger diameter cylinder chamber 26a, smaller diameter piston 27b being in sliding engagement with the wall of the smaller diameter cylinder chamber 26b. The piston assembly 27 is free to slide within the cylinder 26 so that the working volumes of the cylinder chambers 26a and 26b are variable. The pistons 27a and 27b are constrained to slide within the cylinder chambers 26a and 26b respectively by the relationship between the axial length of the rods 29 and the axial length of the cylinder 26.

The pressure regulator 25 has an inlet pipe 30 extending from the cylinder 26 and opening into the bottom of the cylinder chamber 26a. The inlet pipe 30 terminates in a valved coupling 31 and is provided with a vent valve 32. An outlet 33 is provided in the cylinder head, i.e. at the top of the cylinder chamber 26b.

Since in the illustrated embodiment the regulator 25 is used to inflate and pressurise two stopping bags 1a, 1b the outlet 33 is fitted with a Y piece 34 which is connected to bag inflation hoses 22a and 22b by way of valves 35 and 36 respectively. The cylinder head is also provided with a removable plug 37 which may be removed to allow the cylinder chamber 26b to be quickly filled or emptied of water. A pressure gauge 38 is provided to indicate the pressure within the cylinder chamber 26b.

The drawing shows the apparatus in use with the bags 1a and 1b already inflated. However, the pressure regulator 25 has a duel function in this embodiment, i.e. it is used to initially inflate the bags 1a, 1b as well as to regulate the pressure within them. Operation of the pressure regulator 25 to both inflate the stopping bags 1a and 1b and regulate the pressure within them will now be described.

Prior to operation the cylinder chamber 26b is filled with water so that the piston assembly 27 lies at or near the bottom of its stroke. The inlet pipe 30 is then connected to an offshoot 39 of the bypass pipe 17 with the valve 31 closed. The inflation hoses 22a and 22b are connected to the Y piece 34, again with the valves 35 and 36 closed. Once the regulator 25 has been correctly connected the valves 31, 34 and 35 are opened.

When the valve 31 is opened the pressure within the cylinder chamber 26a rises to that of the water within the pipe 3 upstream of the bagging apparatus. This exerts a force on the piston 27a which is greater than that exerted on piston 27b by the water pressure within cylinder chamber 26b. The piston assembly 29 is driven upward by the pressure within the cylinder chamber 26a thereby forcing water out of the cylinder chamber 26b and into the bags 1a, 1b via inflation hoses 22a and 22b, thereby inflating the bags. As the bags 1a, 1b are inflated the pressure within the bags, and thus within the cylinder chamber 26b, increases. The piston assembly 27 will continue to force water into the bags 1a, 1b until the force exerted on the piston 27b equals that exerted on piston 27a, i.e. equilibrium is reached. It will, however, be appreciated that the force exerted on each piston is a function of the pressure within the respective cylinder chamber 26a, 26b and the surface area of the piston 27a, 27b. Thus, since the piston 27b has a smaller surface area than the piston 27a, the pressure in chamber 26b will be higher than the pressure in chamber 26a when the equilibrium is reached. The pistons are relatively sized in this way to ensure that the pressure within the bags 1a and 1b is slightly greater than that within the pipe 2 to provide an effective seal. Indeed, it has been found that to provide an effective seal the bags should preferably be pressurised to approximately 1.18 times the pressure within the pipe 2 upstream of the bag. This is readily achieved by ensuring that the area of the piston 27a is 1.18 times as big as the area of piston 27b.

Once the bag has been inflated, the pressure within the bags 1a and 1b is automatically regulated as a function of the pressure upstream of the pipe. That is, if the pressure in the pipe 3 drops the pressure in the chamber 26a will drop so that the force exerted on the piston 27a will decrease allowing water to be forced back into the chamber 26b from the bags until the force across the piston assembly 27 has again been equalised. The reverse will of course occur should the pressure in the pipe 3 increase. It will be appreciated that as the pressure fluctuates in the pipe a corresponding fluctuation will occur in the pressure of the bags 1a and 1b which will always remain at a predetermined proportion of the pressure in the pipe 3 (eg 1.18 times greater than the pressure in the pipe).

Thus, the pressure regulator 25 operates both to inflate the bags 1a and 1b and to ensure that the pressure within the bags is regulated as a function of the pressure in the pipe 3 upstream of the bag installation. Moreover, the particular pressure regulator illustrated achieves this without the requirement for any external power source, since the driving force is provided by the water pressure within the pipe 3. The gauge 38 provides a constant reading of the pressure within chamber 26a and thus the pressure within the bags 1a and 1b. It will also be appreciated that because of the simple operation of the regulator 25 there is no delay between changes in the pressure within the pipe 3 and the bag 5.

Once the bags have been inflated, the downstream bypass valve 21 could be opened (if it is not already open) to provide flow past the working section of the pipe for as long as the work has been carried out. At this time the recharge valve 15 will be closed. When the work is complete the recharge valve 15 is opened to refill the working section of the pipe 2. Once this has been refilled, the pressure unit control valve 3 is closed and the vent valve 32 provided in the inlet pipe 30 is opened. Water is then discharged via the vent valve 32 from the chamber 26a as water is forced back into chamber 26b from the pressurised bags 1a and 1b. In other words, opening the vent valve 32 allows the bags to deflate re-establishing flow through the pipe section 2. Once the bags have been deflated the hose valves 35 and 36 may be closed and the hoses 22a and 22b disconnected from the bag insulation apparatus. The bags and other machinery may then be removed and the holes 8a, 8b in the pipe closed in accordance with conventional procedures.

The particular form of pressure regulator illustrated is advantageously simple in construction and operation. It can be employed in the relatively hostile environments that may be found when working on pipe lines requiring no supervision and little maintenance. A particularly important advantage of the regulator illustrated is that it requires no external power source as the driving force is provided by the water within the pipe line 3. In addition, the regulator functions both to initially inflate the bags as well as to regulate the pressure within them once they are inflated. It will be appreciated, however, that many modifications could be made to the regulator.

For instance, the relative sizes of the pistons can be altered to modify the ratio of the pressure within the pipe line 3 and within the bags 1a and 1b. Other details of the particular piston arrangement can of course vary widely. The function of this particular type of regulator in which the water pressure in the bags is controlled directly as a function as the pressure in the pipes just requires two pistons mechanically linked together. For instance, the two pistons could move in quite separate chambers.

The regulator need not be used to initially inflate the bags arid some other means could be provided to inflate the bags prior to connection of the regulator. In addition, although water has been found to be a particularly useful medium to inflate the bags other fluids could be used. Liquids are however preferred due to their in compressible nature.

The regulator illustrated could be modified to take advantage of the water in the pipe 3 to fill the chamber 20b prior to inflation of the bags. This could be achieved by the provision of valves which initially function to allow inlet water to fill the chamber 26a but which automatically close when the chamber is full to allow the pressurisation of the bags to begin.

Whilst the illustrated embodiment of the invention is advantageously simple, alternative embodiments might include pressure regulators driven by an external power source and which are provided with compressors etc to regulate the pressure in the bags 1 and 2 in response to the pressure in the pipe 3. The essence of the invention is the provision of a pressure regulator which automatically regulates the pressure within the bags in response to changes in the pressure within the pipe line 3. This could include microprocessor controlled systems which employ electronic transducers to monitor the pressure in the pipeline 3 and to control a pump/compressor and vent valves etc to regulate the pressure in bags 1a and 1b accordingly.

Whereas the invention is expected to be particularly useful in conjunction with stopping bags used in water pipes there is of course no reason why the invention cannot be used to regulate the pressure of stopping bags used in other applications and is thus not limited to stopping systems designed for water pipes, or indeed liquid pipes.

Other possible modifications will be readily apparent to the appropriately skilled person.

What is claimed is:

1. A method of controlling the fluid pressure of an inflatable stopping bag used to block the fluid flow through a fluid conduit, the method comprising:

pressurising the bag upon a pressure regulator which operates to regulate the pressure of the bag as a function of the instantaneous pressure in the pipe upstream of the stopping bag;

wherein:
the pressure of the fluid in the pipe upstream of the stopping bag is transmitted to the pressure regulator, the pressure providing the force required to pressurize the stopping bag.

2. A method according to claim 1, wherein the pressure regulator is connected directly between the pipe and the bag via a first fluid connection which is made between the pressure regulator and the pipe upstream of the stopping bag to transmit the pressure of the pipeline to the pressure regulator, and a second fluid connection from the pressure regulator to the stopping bag to transmit to the stopping bag, wherein the pressure maintained in the second fluid connection is regulated in direct response to changes of pressure in the first fluid connection.

3. A method according to claim 2, wherein the pressure regulator comprises a first fluid chamber in fluid communication with said first fluid connection, a second fluid chamber in communication with said second fluid connection, a first piston moveable within said first fluid chamber in response to changes in pressure within the first chamber, and a second piston connected to said first piston which transmits the force exerted on the first piston to the fluid within the second chamber and thus to the fluid within the second fluid connection and stopping bag.

4. A method according to claim 3, wherein the dimensions of the first and second chambers and first and second pistons are selected so that when the force exerted on the first piston by the fluid within the first chamber equals the force exerted on the second piston by the fluid within the second chamber, the pressure in the second chamber is higher than the pressure within the first chamber by a fixed predetermined proportion, such that the pressure maintained within the stopping bag is always a fixed proportion of the pressure within the pipe upstream of the stopping bag.

5. A method according to claim 1, including the step of initially inflating the stopping bag using fluid supplied to the stopping bag from the pressure regulator.

6. A method according to claim 1, wherein the fluid required for pressurizing the stopping bag is supplied to the pressure regulator from the pipe upstream of the stopping bag.

7. A method according to claim 1, wherein the fluid conduit is a water pipeline.

8. A method according to claim 1, wherein the fluid used to pressurize the stopping bag is water.

9. Apparatus for regulating the pressure in an inflatable stopping bag for use in blocking a fluid conduit, the apparatus comprising a pressure regulator which automatically regulates the pressure in the stopping bag when in use in response to the instantaneous pressure within the fluid conduit upstream of the stopping bag, and means for transmiting the pressure of the fluid in the pipe upstream of the stopping bag to the pressure regulator, said transmitted pressure providing the force required to pressurise the stopping bag.

10. A method according to claim 9, wherein the pressure regulator operates to maintain the pressure in the stopping bag at a predetermined proportion of the instantaneous pressure of the fluid in the pipe upstream of the stopping bag.

11. Apparatus according to claim 9, wherein the pressure regulator comprises a first piston moveable in a first piston chamber and a second piston moveable in a second piston chamber, the first chamber in use being pressurized to the same pressure as the fluid upstream of the stopping bag, the second piston chamber in use being pressurized to the same pressure as the fluid used to inflate the stopping bag, wherein the first and second pistons are connected such that the force exerted on the first piston by fluid in the first piston chamber opposes the force exerted on the second piston by the fluid in the second piston chamber, so that the pistons tend to move to equalize the force exerted on each piston as pressure within the pipe varies, thereby regulating the pressure within the stopping bag in direct response to changes in pressure in the pipe.

12. Apparatus according to claim 11, wherein the first and second piston chambers are portions of a single cylinder, first and second pistons being connected to reciprocate together along the axis of the cylinder.

13. Apparatus according to claim 11, wherein the relative dimensions of the pistons and piston chambers are proportioned such that when the force exerted on each of the pistons is equalized the pressure within the second chamber is greater than the pressure within the first chamber so that the pressure in the stopping bag is always greater than the pressure in the pipe upstream of the stopping bag.

14. Apparatus according to claim 9, comprising a port for filling said second chamber with fluid which fluid in use is used to inflate the stopping bag as the pistons move in response to fluid supplied to the first chamber from the pipe upstream of the stopping bag.

15. Apparatus according to claim 14, wherein valve means are provided for filling said second chamber with fluid from the pipe upstream of the stopping bag prior to pressurisation of the stopping bag.

16. Apparatus according to claim 9, wherein the pressure regulator operates to maintain the pressure in the stopping bag at a predetermined proportion of the instantaneous pressure of the fluid in the pipe upstream of the stopping bag.

* * * * *